United States Patent [19]
Eckelman

[11] Patent Number: 5,495,825
[45] Date of Patent: Mar. 5, 1996

[54] DISPOSABLE BIRD FEEDER

[76] Inventor: Bruce W. Eckelman, 5450 SW. 18th Dr., Portland, Oreg. 97201

[21] Appl. No.: 239,905

[22] Filed: May 9, 1994

[51] Int. Cl.⁶ .................................................. A01K 39/01
[52] U.S. Cl. .................................................. 119/57.8
[58] Field of Search ................... 119/57.8, 57.9, 119/52.2, 52.3

[56] References Cited

U.S. PATENT DOCUMENTS

| | | | |
|---|---|---|---|
| 2,195,575 | 4/1940 | Mallgraf | 119/52 |
| 2,775,226 | 12/1956 | Early | 119/52 |
| 2,891,711 | 6/1959 | Early | 229/17 |
| 3,089,462 | 5/1963 | Brockmann | 119/52 |
| 3,179,244 | 4/1965 | Kuhn | 206/47 |
| 4,233,941 | 11/1980 | Webster | 119/52 |
| 4,408,565 | 10/1983 | Kerbs et al. | 119/52 |
| 4,947,797 | 8/1990 | Lawrence | 119/52 |
| 4,958,595 | 9/1990 | Richman | 119/52 |
| 4,989,548 | 2/1991 | Short et al. | 119/52 |

*Primary Examiner*—Todd E. Manahan
*Attorney, Agent, or Firm*—Eugene M. Eckelman

[57] ABSTRACT

A housing has a base portion with a recess that holds a supply of bird seed. Walls are foldable upwardly from the base portion to form side walls and a top wall. The front and rear of the walls are open to provide access for birds using the feeder at the front and to allow the rear of the feeder to face a glass surface. The rear of the feeder has a removable attaching strip for connection to a glass surface. Attachment is preferably by a pressure sensitive adhesive. The side walls fold relative to the base and have locking engagement on the recess for confining a pre-packaged bird seed in the recess. The base portion has a flange which serves as a perch for birds at the front of the feeder.

6 Claims, 4 Drawing Sheets

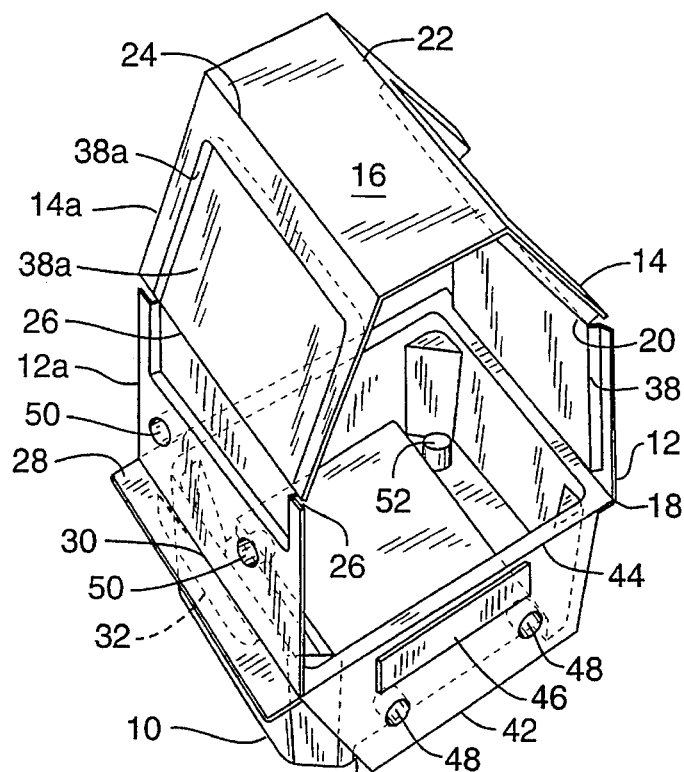
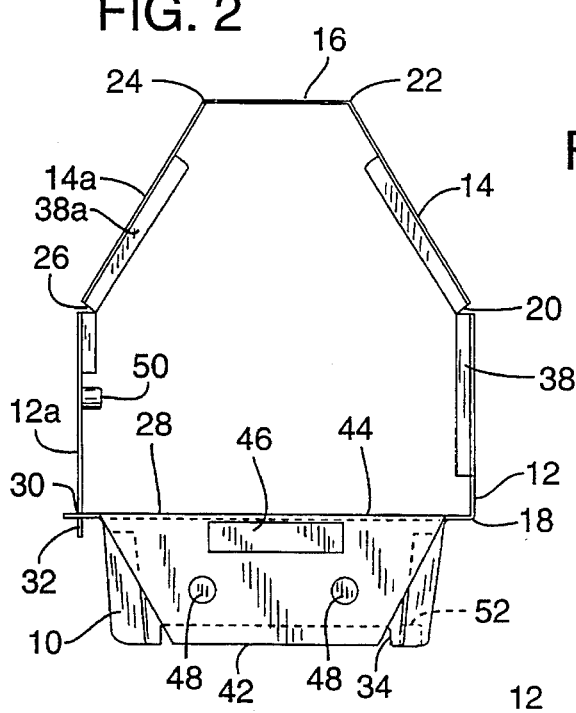
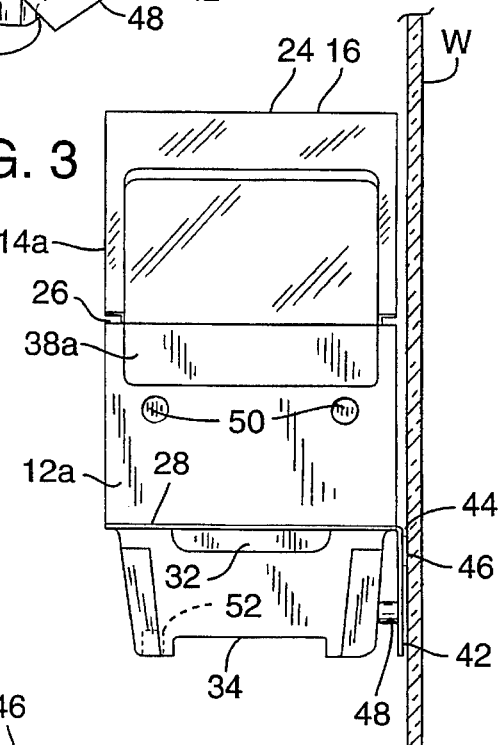
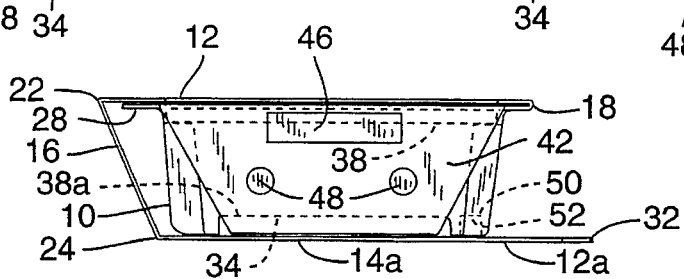

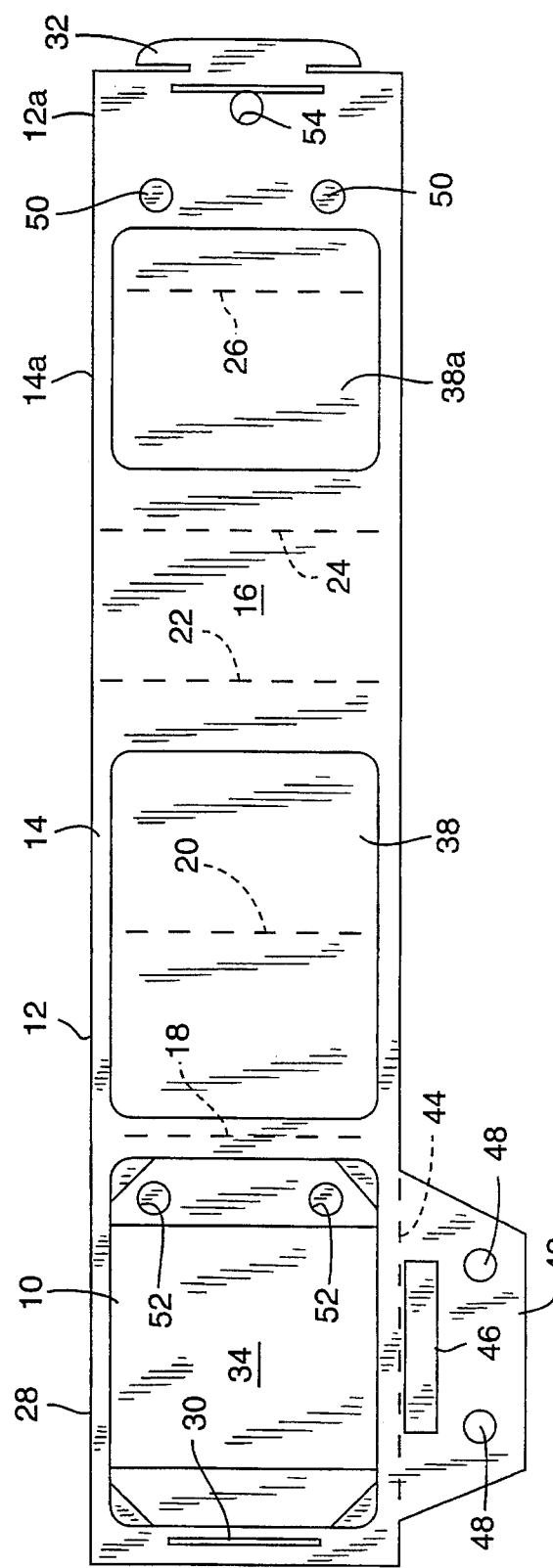
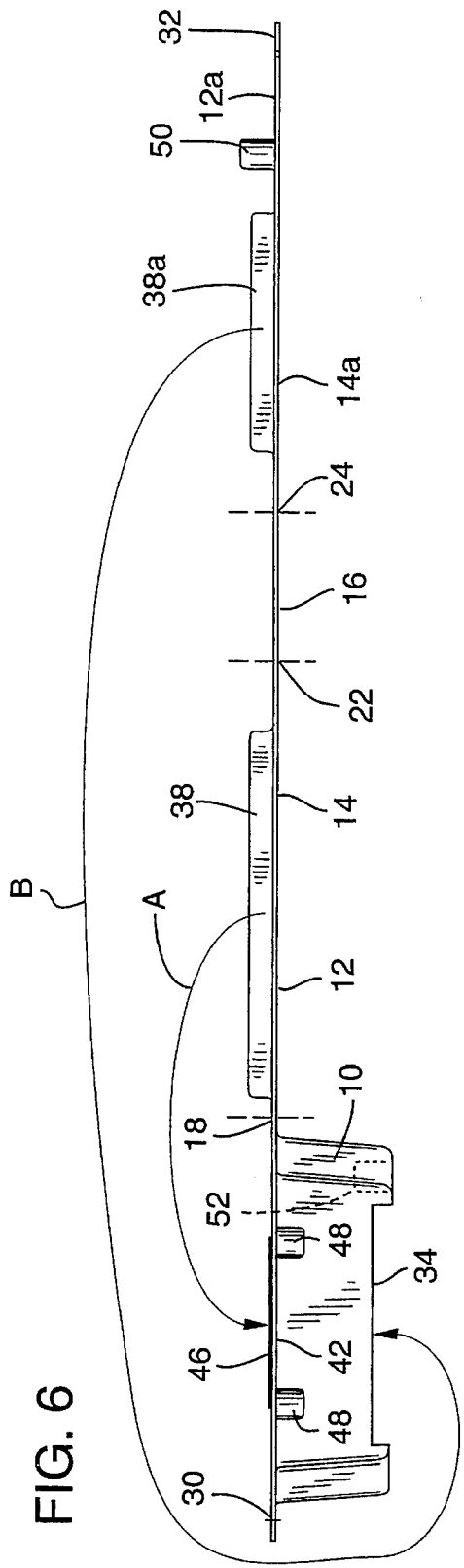
FIG. 5
FIG. 6

5,495,825

DISPOSABLE BIRD FEEDER

BACKGROUND OF THE INVENTION

This invention relates to new and useful improvements in bird feeders.

Various types of bird feeders have been devised including feeders that are foldable to make them compact in structure for shipment and sale to the public. Representative feeders of this type are shown in U.S. Pat. Nos. 4,408,565, 4,989,548, 2,891,711, 4,958,595, 4,947,797, 4,233,941, 3,179,244, and 2,195,575. Feeders have also been devised that are disposable whereby to eliminate need for refilling or cleaning. Representative disposable feeders are shown in U.S. Pat. Nos. 4,233,941, 4,947,797 and 4,958,595.

Objects of the present invention are to provide substantial improvements over prior feeders of the above type in a practical, inexpensive and foldable structure, comprising novel mounting means for attachment to a glass surface, novel means for presenting seed to the birds and for viewing the birds in the act of feeding, novel folding of the feeder and packaging of bird seed therein, and a novel and attractive appearance.

SUMMARY OF THE INVENTION

In carrying out the objects of the invention, a housing having a base portion and wall portion is formed from a single blank of material. The wall portions are connected to the base portion by hinge means and have hinge connections to each other and can close the base portion in a packaged condition of the feeder for shipment, storage and presentation to purchasers. Bird seed may be pre-packaged in the base portion. The wall portions fold out to form a barn-shaped configuration. The front and rear of the housing are open to provide access at the front for birds to feed and to provide an opening at the rear to face a glass surface such as a window for securement thereto. The rear portion of the housing has a pressure sensitive strip for attaching the feeder to the glass. With the feeder attached to the outside surface of a window, persons inside the house can observe the birds as they feed at close range. The feeder is disposable.

The invention will be better understood and additional objects and advantages will become apparent from the following description taken in connection with the accompanying drawings.

BRIEF DESCRIPTION OF THE DRAWINGS

FIG. 1 is an isometric view of a first form of the feeder of the invention taken from the rear, this view showing the folded out use condition of the feeder.

FIG. 2 is a rear elevational view of the feeder.

FIG. 3 is a side elevational view of the feeder mounted on a window.

FIG. 4 is a rear view of the feeder in its packaged form.

FIG. 5 is a plan view of the single blank of material from which the feeder is constructed.

FIG. 6 is a side edge view of the blank of material showing a folding pattern by arrows.

DETAILED DESCRIPTION OF A PREFERRED EMBODIMENT

Figure 7:
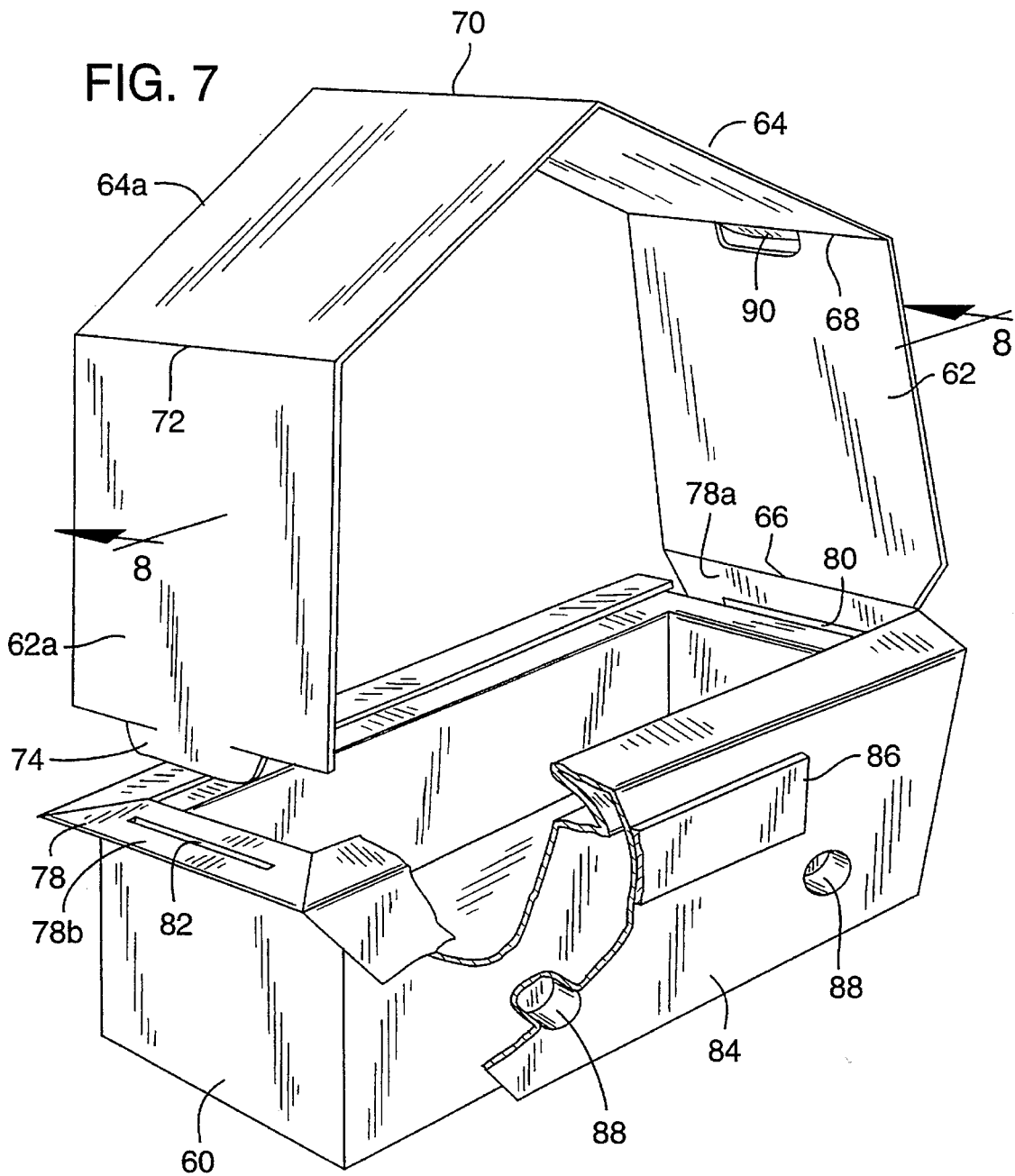
FIG. 7 is an isometric view of a second form of the feeder taken from the rear and showing a partially folded out condition of the feeder, a portion of this view being broken away to show details of structure.
Figure 8:
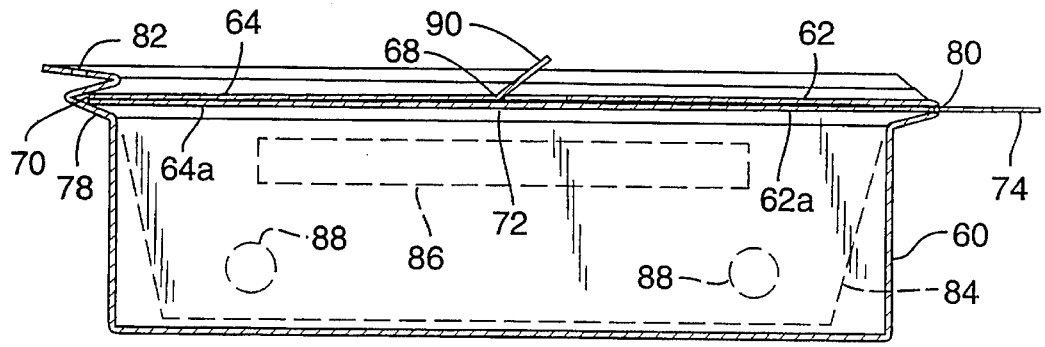
FIG. 8 is a sectional view of the feeder in its packaged form, this view being taken on the line 8—8 of FIG. 7.

With particular reference to the drawings and first to the embodiment of FIGS. 1–6, the invention comprises a housing which has an overall configuration when formed that resembles a common barn shape such as a hip roof barn. The feeder of this embodiment comprises a seed container base portion 10, opposite vertical side walls 12 and 12a, and oppositely angled wall portions 14 and 14a. The portions 14 and 14a may meet at the top in a peak or as shown, these portions preferably connect to a flat top roof portion 16.

The feeder is formed from a single elongated blank of material, FIGS. 5 and 6, such as paper or plastic. A vacuum process for forming a transparent product is preferred. The base portion 10 comprises a rectangular cupped or recessed member from which the wall portions 12, 14, 16, 14a and 12a extend. The blank includes hinge means 18 between the base portion 10 and wall portion 12, hinge means 20 between wall portions 12 and 14, hinge means 22 between wall portions 14 and 16, hinge means 24 between wall portions 16 and 14a, and hinge means 26 between wall portions 14a and 12a. The hinge means may comprise rows of perforations or fold lines. The top edge of the base portion 10 has a reinforcing flange 28 around its periphery. This base flange at one side of the base portion has a slot 30 arranged to releasably receive connecting tongue means 32 on the free end of side wall portion 12a whereby to connect the wall portions in loop form to the base portion when the feeder is to be set up for use, as will be described in greater detail hereinafter. The bottom surface of the base portion 10 has a recess 34 extending from front to rear.

The wall portion strip of the blank has side depressions 38 and 38a that extend through both of their respective wall portions 12, 14 and 12a, 14a, respectively. Depression 38 is of selected dimension such that when wall portions 12, 14 are laid on the top of the base portion 10 when forming the blank into the feeder, such depression will fit tightly in the top opening of the base portion. Also, depression 38a is of selected dimension such that when the wall portions 12a, 14a are wrapped partially around and under the body portion, such depression will fit tightly in the recess 34, as will be described in greater detail hereinafter.

A support tab 42 depends from the flange 28 on the rear side of the base portion 10. This tab has a hinge connection 44 with the flange 28 and carries a strip 46 of pressure sensitive adhesive. This strip has a removable protective layer over the adhesive in a conventional structure for removal when the device is to be used. The surface of the tab 42 that faces the base portion has abutment extensions 48 formed therein, FIG. 3, that engage the base portion and hold the tab at right angles to the flange 28 to provide a good flush support against a window W or other glass surface. Near the free end of the wall portion strip is a pair of projections 50 formed therein that lock in recesses 52 in the bottom of the base portion when the feeder is folded shut, to be described.

The present feeder is intended as a disposable feeder and one that can be packed and sold retail with a supply of bird feed therein. It is of a shape when folded to have the attractive appearance of a barn.

The feeder is molded from a single blank of material in strip form as shown in FIG. 5. In its shaping for making it available for shipment and sale, the base portion 10 is first filled with bird seed. Thereupon, as indicated by arrow A in FIG. 6, the wall portions 12 and 14 are brought over the top of the base portion. The depression 38 pivots directly over the top of the base portion and is pressed firmly into the top of the base portion in a locking engagement. This fitted engagement assists in closing the base portion for confining the bird seed. Thereupon the wrap of the strip is continued, as indicated by arrow B, wherein the flat top portion 16 extends down the one side, as apparent in FIG. 4, and the side wall portions 14a and 12a are brought across the bottom of the base portion. The depression 38a is pressed firmly into the recess 34 in a locking fit. This fitted attachment further holds the package together for shipment and sale. For further holding the package in folded form, the projections 50 are pressed into their locking recesses 52. As a positive closure, overlapping portions of the flange 28 of the base portion and side edge portions of the walls may be stapled or taped together.

The end of the blank adjacent the locking tab end 32 has an aperture 54 therein. This aperture provides a hanging support for the packaged device in a store display.

To open the feeder, the staples or tape on the flange 28, if used, are removed and the free end of the wall portion strip is pulled downwardly to unsnap the projections 50 from the recesses 52. Unwinding of the wall portion strip from the base portion is continued while pulling depression 38a out of the recess 34 and pulling the depression 38 from the top of the base portion. Thereupon, the tongue end 32 is locked in the slot 30 and the wall portions shaped to the barn contour as shown in FIG. 1. This exposes the bird seed for consumption. In shaping the wall portions, it may be desired to snip edge portions of the hinges 20 and 26, FIG. 1, for ease of shaping the barn. Thereupon, the protective cover for the pressure sensitive adhesive strip is removed and the feeder stuck on the outside of a window surface. The tab 42 that has the adhesive strip thereon has vertical hinged spacing from the body member 10 by abutment extensions 48 with the body portion and serves to provide a good vertical flush support of the tab 42 on the glass. As noted, the front and rear of the feeder are open, thus providing good visibility of birds feeding for persons inside the building. The flange 28 on the front of the feeder provides a perch for birds.

Reference is now made to FIGS. 7–10 showing a second embodiment of the invention. FIG. 7 shows the embodiment in a partially folded out condition. The overall configuration resembles generally a common barn shape as in the FIG. 1 embodiment to provide an attractive appearance. This embodiment comprises a seed container base portion 60, opposite upright wall portions 62 and 62a, and oppositely angled top wall or roof portions 64 and 64a. The base portion 60 and the wall portions are formed in one blank. The base portion comprises a rectangular cupped or recessed member for holding bird seed. The wall portion 62 is connected to one end of the base portion by hinge means 66 and is connected with the top wall portion 64 by hinge means 68. Wall portions 64 and 64a are connected together by hinge means 70 at the peak. Wall portions 64a and 62a are connected together by hinge means 72. The free end of this wall portion strip terminates in a connecting tongue 74.

The upper edge of the base portion 60 comprises a Z-type flange 78. This flange at one end of the base portion, designated by the numeral 78a, is disconnected from the side flange portions 78. A horizontal slot 80 is provided at the base of flange 78a. The flange at the opposite end of the base portion, designated by the numeral 78b, has a vertical slot 82. Slots 80 and 82 are arranged to receive the connecting tongue 74 in various conditions of fold of the feeder, to be described. The front to rear dimension of the opening into the base portion as defined by the peripheral flange is less than the front to rear dimension of the wall portions 62, 62a and 64, 64a. On the other hand the distance between the facing recess portions formed by the Z-type flange 78 is great enough to receive the opposite edges of the wall portions whereby this recess can receive and hold the wall portions in a closed locked condition of the feeder when the wall portions are forced into it, as will be described.

Integrated with the outer edge of the flange 78 at the rear of the base portion is a depending support tab 84 having a strip 86 of pressure sensitive adhesive on it. The surface of the support tab that faces the base portion has abutment extensions 88 formed therein that hold the tab at right angles to the flange 78 to provide a good vertical flush engagement with a glass surface.

Figure 9:
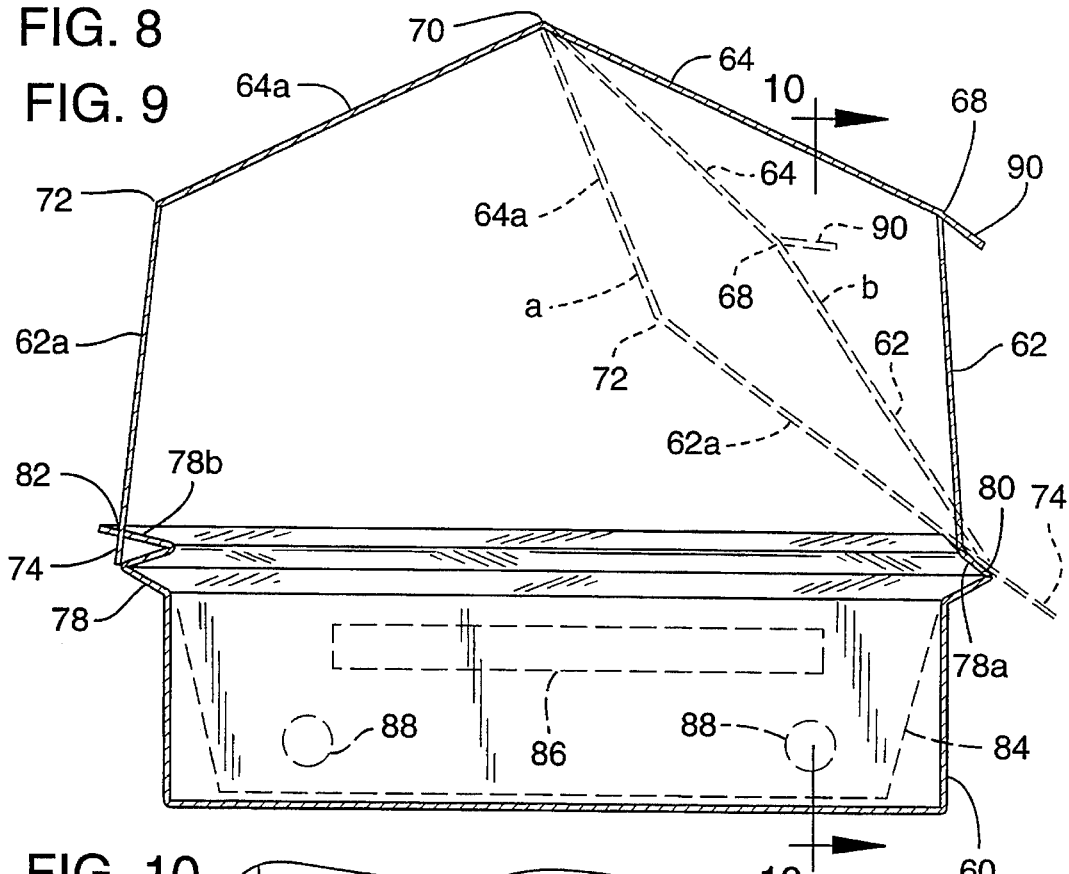
FIG. 9 is a sectional view of the feeder taken similar to FIG. 8 but showing the feeder folded out to its use condition and also showing partial fold positions of the walls in broken lines.
Figure 10:
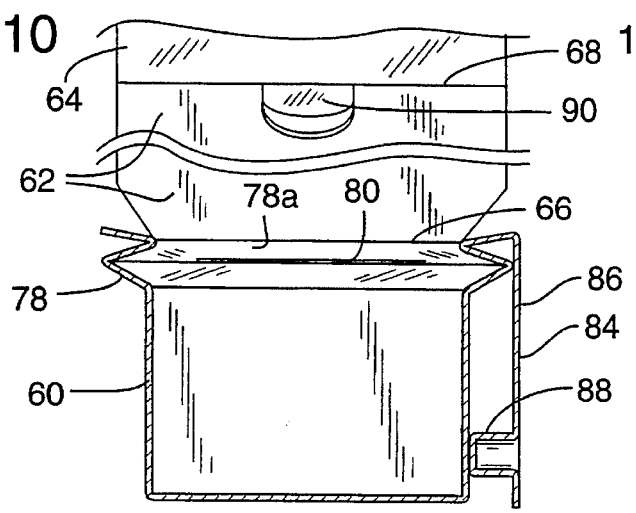
FIG. 10 is a section view taken on the line 10—10 of FIG. 9.

In the opened out use condition of the feeder, FIG. 9, the wall portions are shaped to simulate a barn structure and are held securely by engaging connecting tongue 74 with the slot 82. In packaged form, the wall portions will have been folded to seal the upper open end of the base portion. To accomplish this fold from the open condition of FIG. 9, the tongue end 74 is disengaged from the slot 82 and swung toward the slot 80 at the other end in the manner shown by broken lines a in FIG. 9. At the same time the wall portions 62 and 64 are laid down on the wall portions 62a and 64a so that the wall portions collapse into a flat double top wall, FIG. 8. An initial folding movement of the wall portions 62 and 64 is designated by the broken lines b. As the wall portions 62a and 64a are laid down on the base portion, the connecting tongue 74 approaches and finally is inserted in the slot 80. As stated, the front to rear dimension of the wall portions is greater than the front to rear size of the opening of the base portion. This dimensional relationship of the parts is preselected wherein after the walls are laid down to their flat condition they are forced at their three free edges through this restricted opening and into the Z area of the flange 78, thus forming a locking top cover for the base portion.

When it is desired to use the packaged embodiment of FIG. 7, it is unfolded by releasing the connecting tongue 74 from the slot 80 then folding the walls into the barn shape, and finally locking the connecting tongue 74 into the slot 82. The feeder can then be mounted on the window by means of the pressure sensitive strip 86. Flange 78 serves as a perch for the birds. A tab 90 is provided at the hinge line 68 to provide a finger grip which is used in the folding and unfolding of the walls.

The present feeder thus comprises a practical, inexpensive and foldable structure and one that may be disposed of as desired. It has novel mounting means for attachment to a glass surface which presents the feeder for viewing inside the house as a novelty. It also has novel folding of a holder that packages bird seed and is attractive in simulating a barn.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described my invention, I claim:

1. A disposable bird feeder for mounting on an upright glass surface comprising:

a base portion having bottom, rear, front and side walls and also having an open top, said base portion forming a container for holding a supply of bird feed, said base portion having a lateral extension which together with said base portion is formed from a single blank of material, said lateral extension being hingedly connected across one side of said base portion adjacent the open top thereof, said lateral extension having hinge means intermediate its ends that extend parallel with the hinge connection to said base portion, said lateral extension being capable of hinged shaping on its hinged connection with said base portion and with its intermediate hinge means to extend upwardly and be contoured into a raised cover for said base portion, the front and rear of said cover being open to provide access for birds using the feeder at the front, and pressure sensitive adhesive means at the rear of said base portion for removably attaching the bird feeder to a glass surface and allow viewing of birds feeding thereon from an opposite side of the glass surface.

2. The disposable bird feeder of claim 1 wherein said lateral extension includes at least three of said intermediate hinge means to form a pair of upright side walls of said raised cover and relatively angled roof portions.

3. The disposable bird feeder of claim 1 wherein said base portion has a vertical depending tab connected to the rear wall thereof, said pressure sensitive adhesive being supported on said tab.

4. The disposable bird feeder of claim 1 wherein said lateral extension includes a free end opposite from said hinged connection to said base portion, said base portion having releasable attaching means on the side thereof opposite from its hinged connection with said lateral extension for securing said free end thereto in the raised cover shape of said extension and for releasing said free end for folding of said extension.

5. The disposable bird feeder of claim 4 wherein said lateral extension is of a selected length and includes a selected number of said intermediate hinges and lateral spacing thereof whereby said extension is capable of being wrapped over the top of said base portion, down the far side of said base portion from its hinged connection to said base portion, and back along the bottom, thus compacting the feeder in a non-use condition thereof and also capable of confining bird feed in the base portion.

6. The disposable bird feeder of claim 5 wherein said bottom wall of said base portion includes a recess and said lateral extension has a pair of locking projections selectively located for locking engagement in the open top of said base portion and in the bottom recess of said base portion, respectively.

* * * * *